US010381738B2

United States Patent
Cohen et al.

(10) Patent No.: US 10,381,738 B2
(45) Date of Patent: Aug. 13, 2019

(54) PARASITIC ANTENNA ARRAYS INCORPORATING FRACTAL METAMATERIALS

(71) Applicant: FRACTAL ANTENNA SYSTEMS, INC., Bedford, MA (US)

(72) Inventors: Nathan Cohen, Belmont, MA (US); Ryan Thistle, Waltham, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 0 days.

(21) Appl. No.: 16/006,569

(22) Filed: Jun. 12, 2018

(65) Prior Publication Data

US 2019/0027831 A1    Jan. 24, 2019

Related U.S. Application Data

(60) Provisional application No. 62/518,152, filed on Jun. 12, 2017.

(51) Int. Cl.

| | | |
|---|---|---|
| *H01Q 15/02* | (2006.01) | |
| *H01Q 15/00* | (2006.01) | |
| *H01Q 19/06* | (2006.01) | |
| *G02B 1/00* | (2006.01) | |
| *G02B 5/00* | (2006.01) | |
| *H01Q 17/00* | (2006.01) | |
| *H01Q 21/20* | (2006.01) | |

(52) U.S. Cl.
CPC ......... *H01Q 15/0086* (2013.01); *G02B 1/002* (2013.01); *G02B 5/008* (2013.01); *H01Q 15/0093* (2013.01); *H01Q 17/008* (2013.01); *H01Q 19/06* (2013.01); *H01Q 21/20* (2013.01)

(58) Field of Classification Search
CPC ........... H01Q 15/0086; H01Q 15/0093; H01Q 17/08; H01Q 21/20; H01Q 19/06; G02B 1/002; G02B 5/008
See application file for complete search history.

(56) References Cited

U.S. PATENT DOCUMENTS

| | | | | |
|---|---|---|---|---|
| 7,057,559 B2 * | 6/2006 | Werner | ................ | H01Q 21/061 343/700 MS |
| 9,035,849 B2 * | 5/2015 | Cohen | ................... | H01L 31/042 343/899 |

(Continued)

FOREIGN PATENT DOCUMENTS

| | | |
|---|---|---|
| CN | 203 553 353 U | 4/2014 |
| EP | 2 464 990 A2 | 6/2012 |

OTHER PUBLICATIONS

Yin Jia Yuan et al; "Endfire Radiations of Spoof Surface Plasmon Polaritons" IEEE Antennas and Wireless Propagation Letters, vol. 16, Jul. 18, 2016, pp. 597-600.

(Continued)

*Primary Examiner* — Dieu Hien T Duong
(74) *Attorney, Agent, or Firm* — Cesari and McKenna, LLP (57) ABSTRACT

Novel directional antennas are disclosed which utilize fractal plasmonic surfaces (FPS) that include or present an array of closely-spaced parasitic antennas, which may be referred to herein as "parasitic arrays" or fractal plasmonic arrays (FPAs). These fractal plasmonic surfaces represent improved parasitic directional antennas relative to prior techniques and apparatus.

11 Claims, 6 Drawing Sheets

(56) References Cited

U.S. PATENT DOCUMENTS

2013/0027268 A1  1/2013  Ohno et al.
2017/0061176 A1  3/2017  Cohen

OTHER PUBLICATIONS

International Search Report and Written Opinion dated Aug. 23, 2018 for International Application No. PCT/US2018/037126 filed on Jun. 12, 2018 for Fractal Antenna Systems, Inc., 17 pages.

* cited by examiner

PARASITIC ANTENNA ARRAYS INCORPORATING FRACTAL METAMATERIALS

CROSS-REFERENCE TO RELATED APPLICATION

This application is based upon and claims priority to U.S. provisional patent application 62/518,152, entitled "Parasitic Antenna Arrays Incorporating Fractal Metamaterials," filed Jun. 12, 2017; the entire content of the noted provisional application is incorporated herein by reference.

BACKGROUND

Directional parasitic antennas are an important electromagnetic device with wide application in the modern world. The best-known example of such arrays is the Yagi-Uda antenna. These are parasitic directional rays made from dipole or dipole like elements which are separated from each other by at least an eighth of a wave or more and are not attached directly to each other. When the elements are placed much closer than an eighth of a wave they interact to a point where it is not possible to use them in a directional manner. In other words Yagi-Uda antennas have the advantage of being directional at the expense of a prescriptive design approach.

It will be appreciated that because the elements interact within a Yagi-Uda antenna when placed very close to one another, is not possible to fully take advantage of one of the main aspects of electromagnetic science. That aspect is called evanescent wave transmission. It is also called plasmonic transmission.

In plasmonic transmission electromagnetic waves propagate over very short distances; usually a practical limit being about $1/10$ of a wavelength. Beyond that distance other near field mechanisms tend to dominate and the plasmonic or evanescent mode dies off rapidly (e.g., exponentially).

What is needed therefore is a directional antenna array that takes advantage of the evanescent wave transmission, or plasmonic transmission, to produce a better performing directional antenna that either has better directionality and or smaller size.

SUMMARY

Novel directional antennas are disclosed which utilize fractal plasmonic surfaces (FPS) that include or present an array of closely-spaced parasitic antennas, which may be referred to herein as "parasitic arrays" or fractal plasmonic arrays (FPAs). These fractal plasmonic surfaces represent improved parasitic directional antennas relative to prior techniques and apparatus.

Aspects and embodiments of the present disclosure include or provide for fractal plasmonic arrays on or in shaped surfaces or structures. Such arrays can provide gain and/or directionality unavailable in prior antennas.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

As referenced above, the present disclosure describes novel methods, systems, and apparatus employing and/or providing directional antennas which utilize fractal plasmonic surfaces (FPS) that include or present a closely-spaced array of cells, resonators, or parasitic antennas, which may be referred to herein as "parasitic arrays" or fractal plasmonic arrays (FPAs). The spacing of the arrays may be referred to as close-spaced, closely-spaced, or close-packed. These fractal plasmonic surfaces represent improved parasitic directional antennas relative to prior techniques and apparatus.

As was noted above, in plasmonic transmission electromagnetic waves propagate over very short distances; usually a practical limit being about $1/10$ of a wavelength. Beyond that distance other near field mechanisms dominate and the plasmonic or evanescent mode dies off exponentially. With respect to the interaction of closely-spaced elements, however, the evanescent wave transmission is still present in all antennas but is seldom taken advantage of for practical uses, for the reason stated above.

An aspect of the present disclosure includes a fractal plasmonic surface (FPS) providing a plurality of closely-spaced fractal shaped resonators (also referred to as "fractal cells" or "cells"), so configured such that the adjacent placement of such resonator elements or cells is, e.g., less than $1/10$ of a wavelength ($\lambda$) separation where the wavelength ($\lambda$) is an operational wavelength of the FPS. For applications where a FPS covers a range of or multiple wavelengths of operation, the separation distances between resonators can be designed based on, e.g., the largest wavelength of operation. The fractal cells act as reduced sized and or multiband and or wideband resonators that propagate a band, multiband, or wideband, spectrum of electromagnetic waves from one cell to the next. In accordance with the present disclosure, the terms resonator and antenna are generally used interchangeably herein except where noted.

According to exemplary embodiments of the present disclosure, the size of each fractal cell is substantially smaller for example than a dipole at the lowest frequency of use/operation of a given spectrum. For example, typically four or more cells will take up the same extent as a halfway dipole at the given frequency. Thus, each fractal cell, being substantially smaller than a typical dipole or dipole-like structure, has less spatial extent to cause or experience deleteriously interaction effects when closely spaced, such as detuning from mutual coupling.

When a fractal plasmonic surface, e.g., a single sheet or a manifold looped as a closed surface, is excited at an edge by a radiating element (e.g., a dipole), evanescent transmission occurs throughout the cells on the surface. At the antipodal edge, there will be a discontinuity in impedance with the air or other media, therefore causing the evanescent radiation to radiate freely into or towards the far field. Because the driven element (e.g., a dipole) in this case now interacts with the fractal plasmonic surface, the surface itself acts as a directional lens, imparting gain and/or other appropriate performance characteristics of a parasitic directional antenna.

It will be appreciated that such a fractal plasmonic surface is not a Yagi-Uda antenna. The spacing between cells and the spacing to the driven element is outside of any prescriptions for a Yagi-Uda antenna. In contrast, such close spacing is not possible with Yagi-Uda antennas, meaning that those conventional antennas cannot support evanescent-wave transmission. According to embodiments of the present disclosure, FPAs with their smaller cells (e.g., with fractal, fractal-like, and/or metamaterial elements) and their close spacing enable new types of parasitic directional antennas.

Not only is such a FPS-based parasitic directional antenna novel in its ability to take advantage of evanescent transmission, but such an antenna can also have an advantageous form factor. Specifically, the gain produced by such a FPS-enabled antenna can be far higher than expected in comparison to a conventional Yagi-Uda antenna. The following description, referencing FIGS. 1A-4, provides further details of exemplary embodiments of FPS-based directional antennas according to the present disclosure.

While the disclosed invention refers to an end fire parasitic directional antenna, it will be noted that a small reflector at the antipodal edge will also allow the antenna to be broadside. This antenna when placed at approximately a 45° angle, redirects the end fire radiation to make it broadside.

Another unusual attribute space of this novel invention is that the FPS may be curved to redirect and focus the electromagnetic waves in a preferred direction, including, e.g., at or about 90° ($\pi/2$), or at or about 45° to 135° ($\pi/4$ to $3\pi/4$) to the positioning of the driven element and FPS edge; other angles and directions, including composite or multiple directions can be achieved within the scope of the present disclosure. It will be noted that it is not possible in a Yagi-Uda antenna to curve the boom of the antenna in order to redirect the directional radiation. Accordingly, an aspect of the present disclosure, it is possible to do that, opening new opportunities for the use of directional antennas.

In exemplary embodiments, a fractal plasmonic array (FPA) is configured as a looped belt of fractal resonators (or, fractal metamaterial) and placed in the nearfield of an exciting antenna, for example but not limited to, a ½ wave dipole. The excitation is parasitic. The FPA, in such an embodiment, generates a strong evanescent surface wave parasitically with no direct connection between the fractal resonators.

If the looped belt is not circularly configured, then exciting the edge produces radiation of the evanescent surface wave at the antipodal edge which provides a lens like gain amplification and concurrent beamwidth narrowing (an end-fire directional antenna). The respective gain increase is substantially proportional to the one sided area (effective aperture) of the FPA.

Figure 1A:
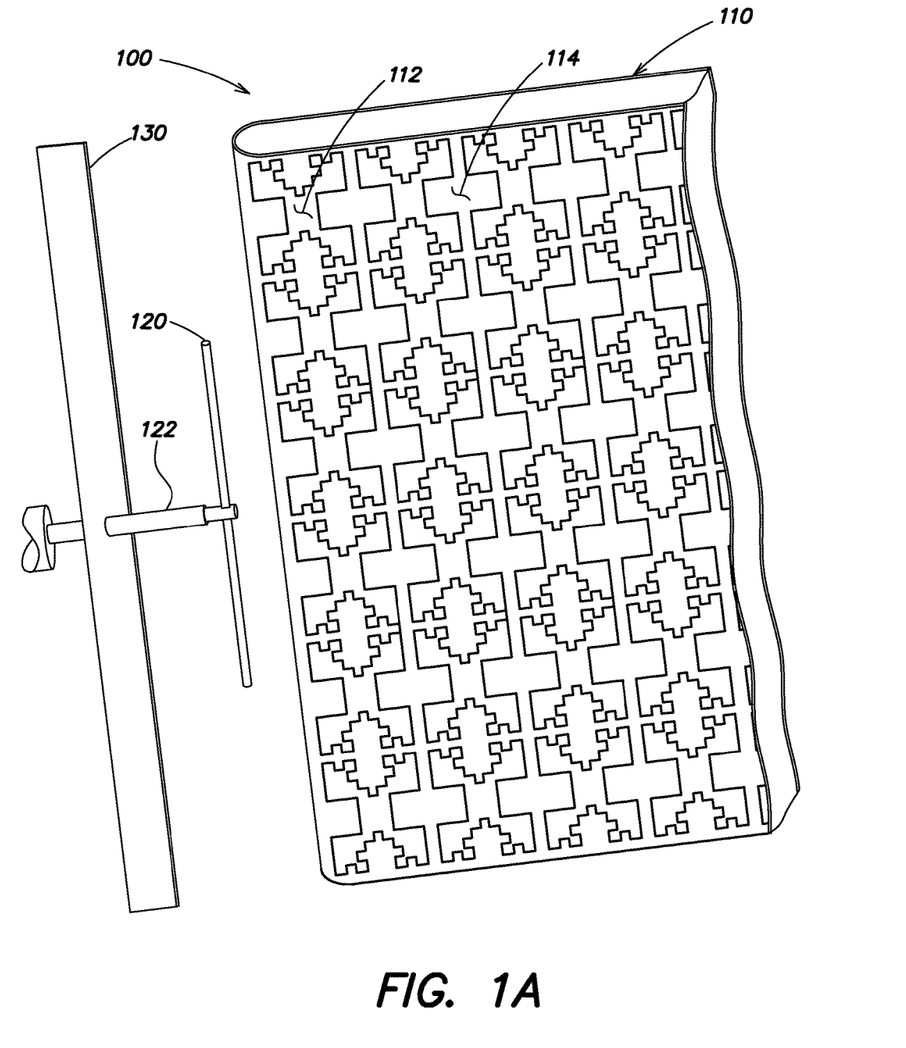
FIG. 1A depicts an example of a fractal plasmonic array used with a parasitic reflector in accordance with an exemplary embodiment of a directional antenna system according to the present disclosure.
Figure 1B:
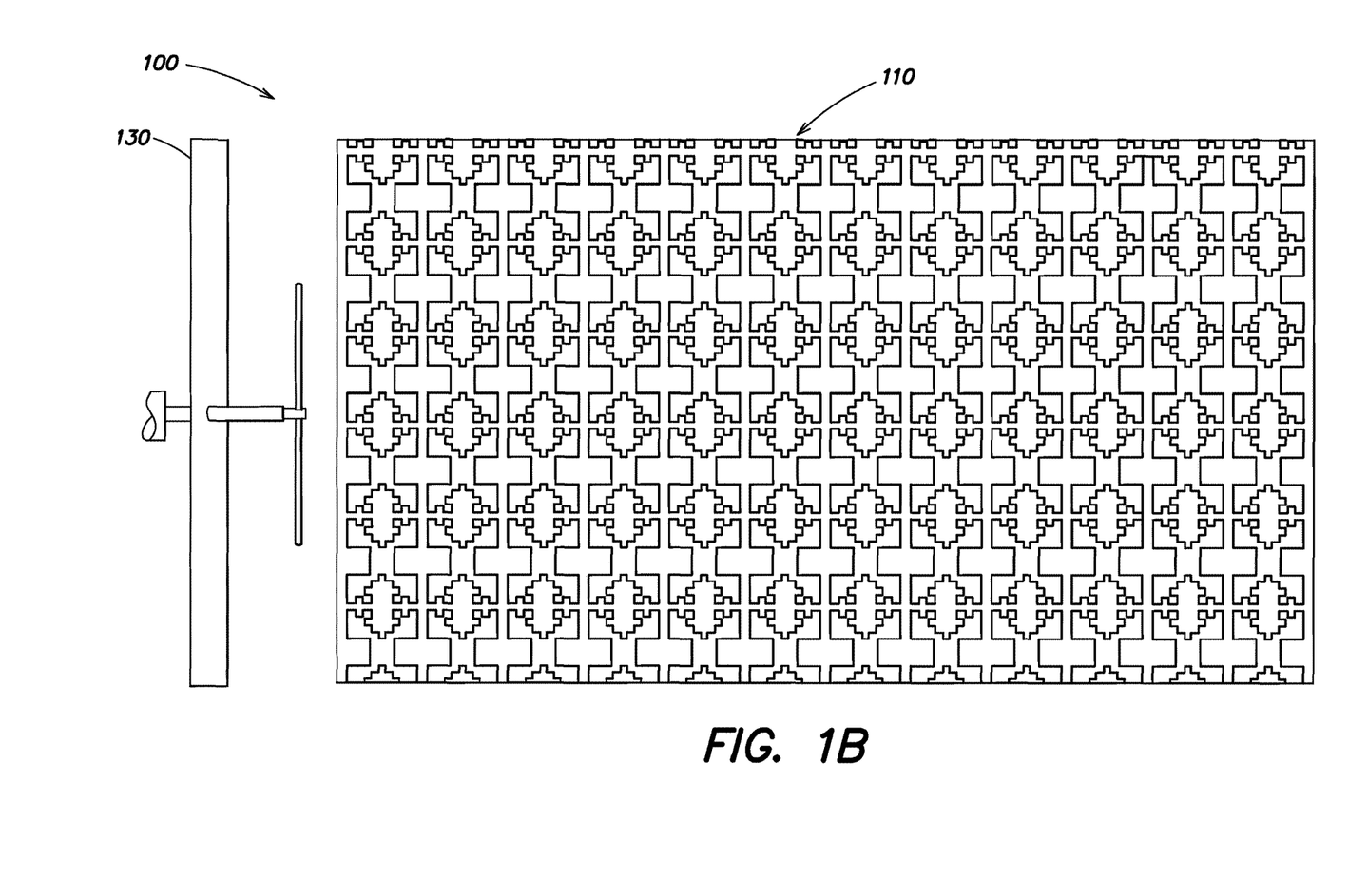
FIG. 1B depicts another view of the fractal plasmonic array and reflector of FIG. 1A.

An FPA may additionally be configured with a parasitic reflector to make the resulting antenna unidirectional. FIG. 1A depicts an example of a fractal plasmonic array used with a parasitic reflector as a directional antenna system 100 in accordance with an exemplary embodiment of the present disclosure; FIG. 1B depicts another view of the fractal plasmonic array and reflector of FIG. 1A.

As shown in FIG. 1A, directional antenna system 100 includes a fractal plasmonic array 110 including plurality of fractal cells 112 (or fractal metamaterial) disposed on a support surface 114. The cells 112 and support surface 114 are configured in a closed belt or loop that has a width, a length, and a height. Examples of a suitable material for a support surface (or, substrate) can include, but are not limited to, polyimide, polyamide, $FR_4$, polyester, ceramic, and the like. The fractal cells can be made of any suitable conductive material, including, but not limited to, conductive paints, electroplated or electroless metals, deposited metals, and the like.

With continued reference to FIG. 1A, system 100 can also include a feed or driven element 120 (shown as a dipole), which may be connected to receive power through a coaxial connection 122. A reflective element or reflector 130 may be present to provide or facilitate directivity for the antenna. As shown, reflector 130 will reflect energy toward the fractal plasmonic array 110.

Figure 2A:
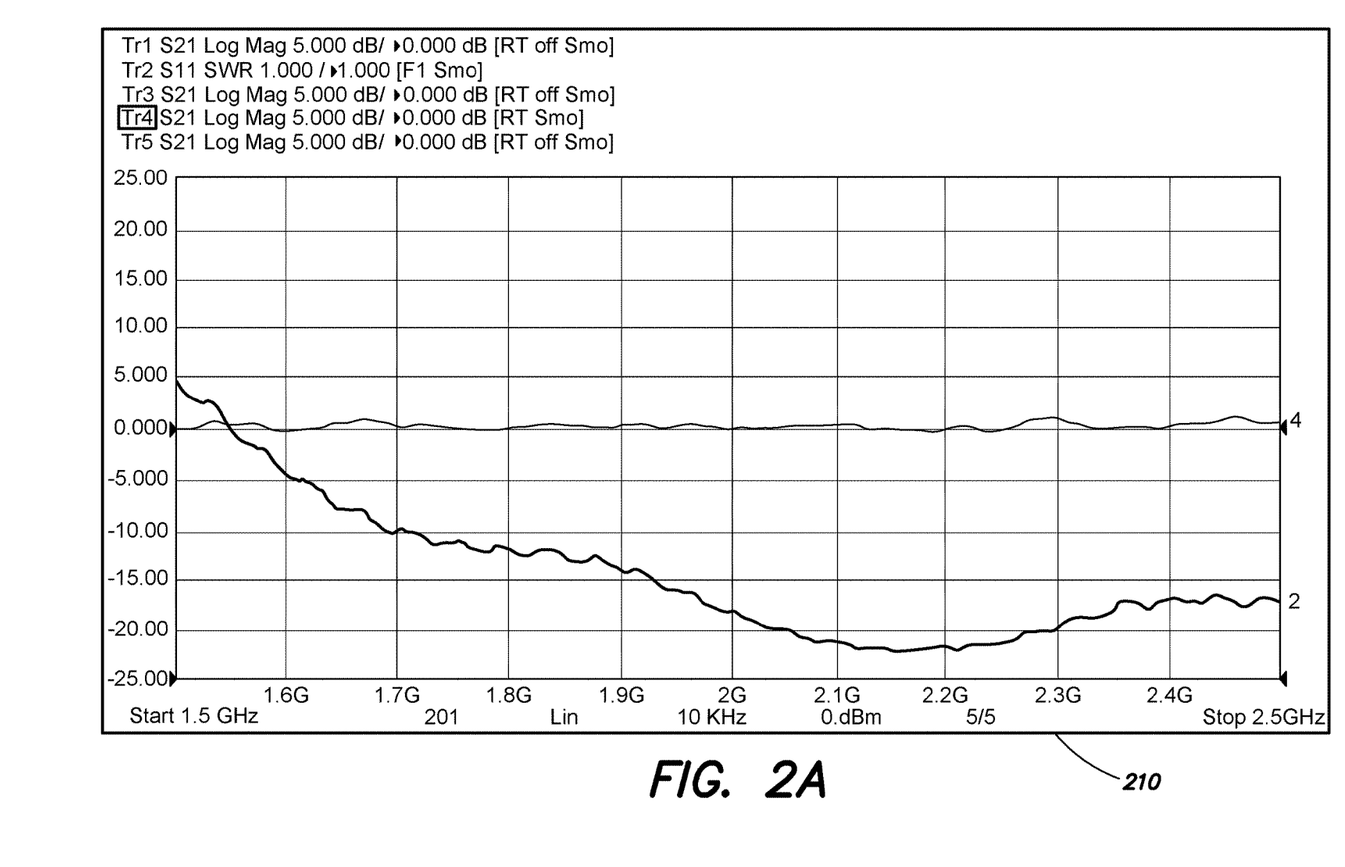
FIGS. 2A-2B depict plots showing the SWR and gain of a dipole compared to a fractal plasmonic array in accordance with an exemplary embodiment of the present disclosure.
Figure 2B:
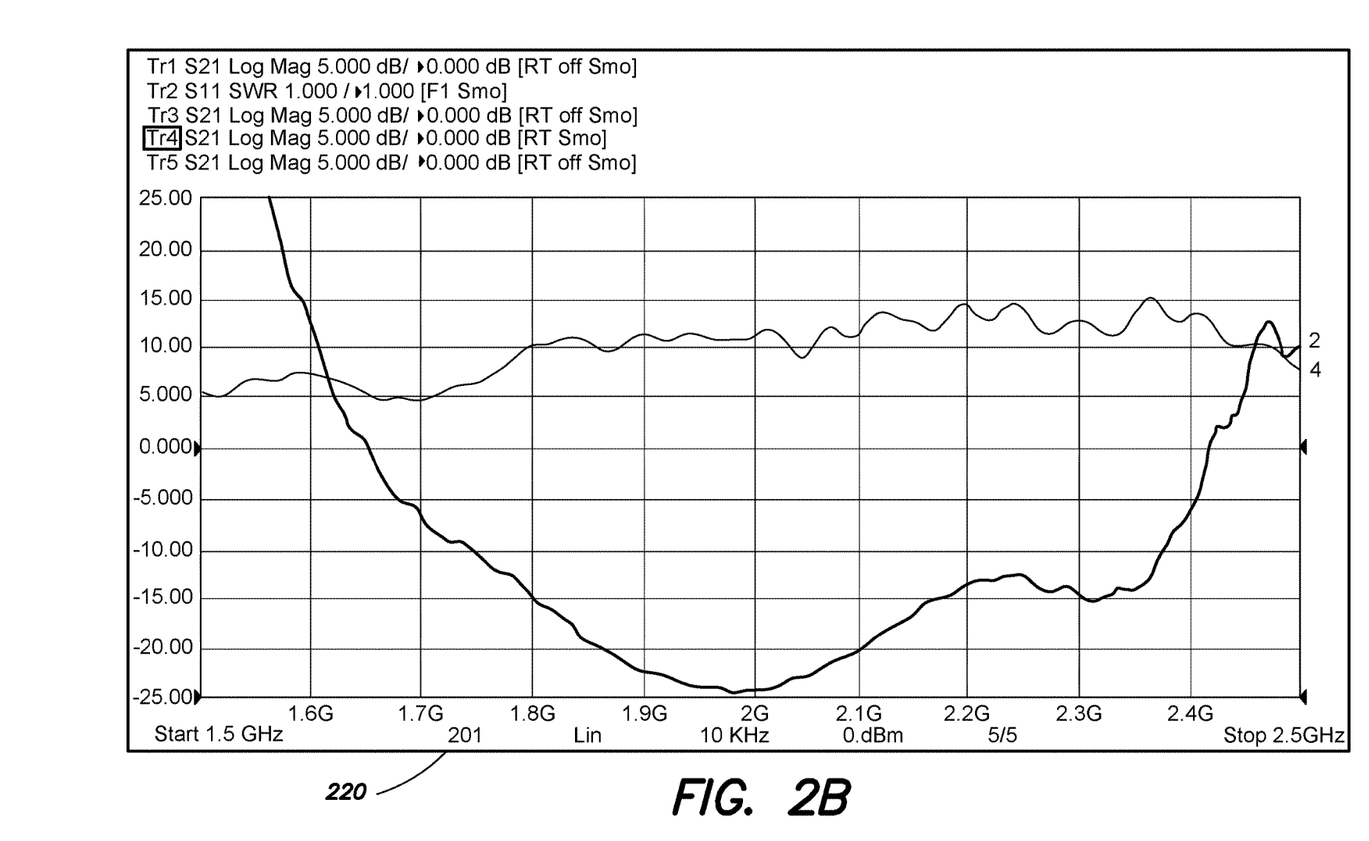

FIGS. 2A-2B depict plots 210, 220 showing the SWR and gain of a dipole compared to a fractal plasmonic array in accordance with an exemplary embodiment of the present disclosure. It will be appreciated that this peak gain manifests as close to 15 dBi in this example, with a 2:1 bandwidth of roughly 300 MHz at 2 GHz (where bandwidth refers to, e.g., −10 dB Return Loss bandwidth, or the frequency range where the SWR is less than 2:1). It will be appreciated that the FPA need not be limited to S-band, but embodiments may be devised, by scaling in size, to work from HF radio, through microwave, to infrared, visible light, and ultraviolet. Furthermore combination of the embodiments may be devised to access multiple regions of the electromagnetic spectrum.

Further FPA embodiments and aspects of the present disclosure include, but are not limited to, 1) attaching a reflecting structure at the end of the end-fire point, e.g., at approximately a 45 degree angle, so as to divert the end-fire radiation to broadside, thereby enabling the FPA to function as a broadside radiator; 2) placing multiple dipoles on one edge in a multi-faceted arrangement, so as to provide a beam steering option by turning single or pairs of antenna on and off.

In exemplary embodiments, a FPA may be configured so that the fractal resonators are uniform in size and spacing for at least one passband of choice, and this demonstrates that the FPA does not function through a gradient of index of refraction, nor as a curved geometric interface with a differing index of refraction. Therefore it is novel with respect to prior art and is not, for example, a Yagi-Uda antenna, nor a phased array.

Figure 3:
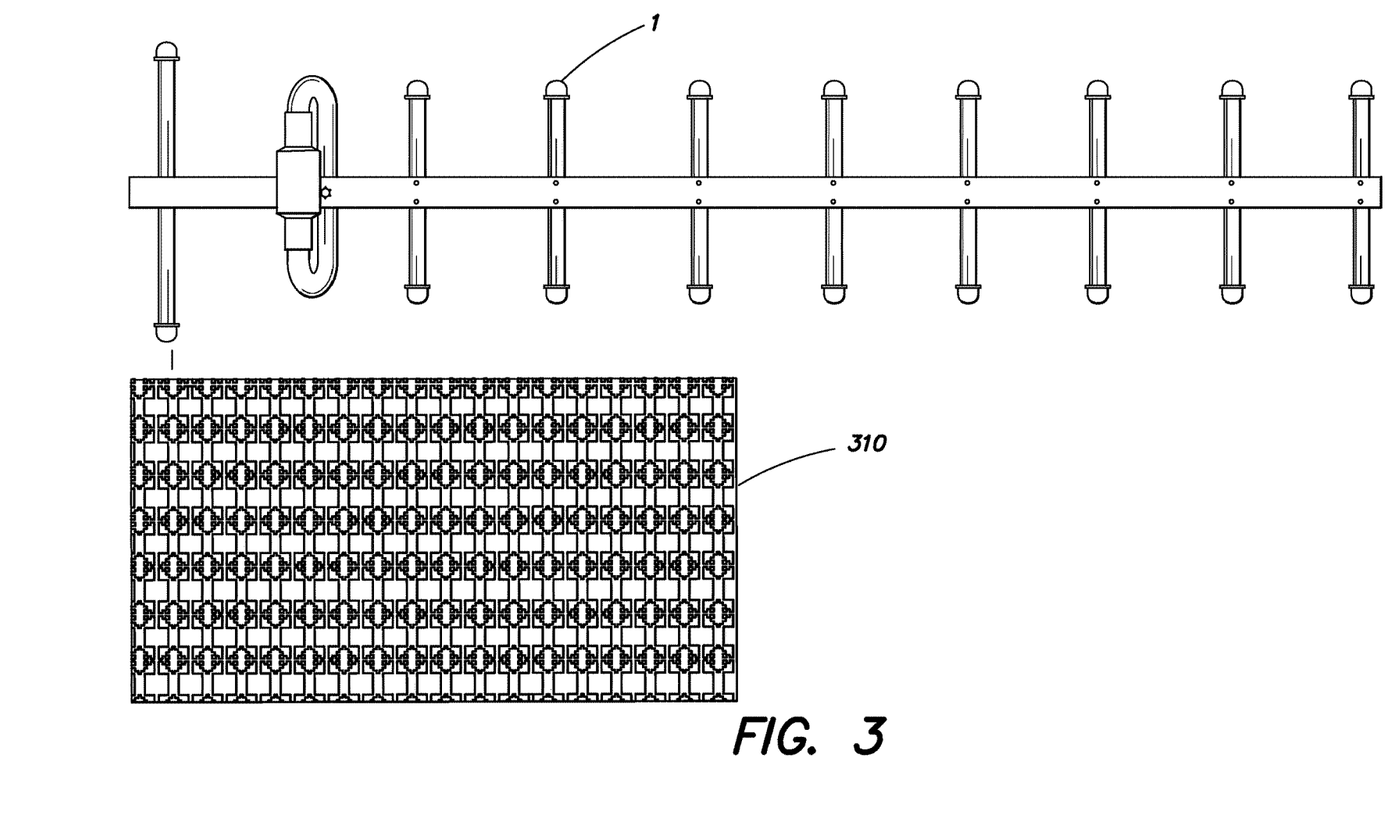
FIG. 3 is a photograph showing a side-by-side size comparison of a conventional Yagi-Uda antenna and a fractal plasmonic array antenna according to the present disclosure having substantially equivalent gain and bandwidth performance.

FIG. 3 is a photograph showing a side-by-side size comparison of a conventional Yagi-Uda antenna 1 and a fractal plasmonic array antenna 410 according to the present disclosure having substantially equivalent gain and bandwidth performance.

It will be appreciated that a FPA according to the present disclosure acts as a lens-like device and may therefore be used as an augmentation for a variety of other conventional antennas; moreover, use is not limited to RF or microwave frequencies, when properly scaled for the appropriate wavelengths.

Figure 4:
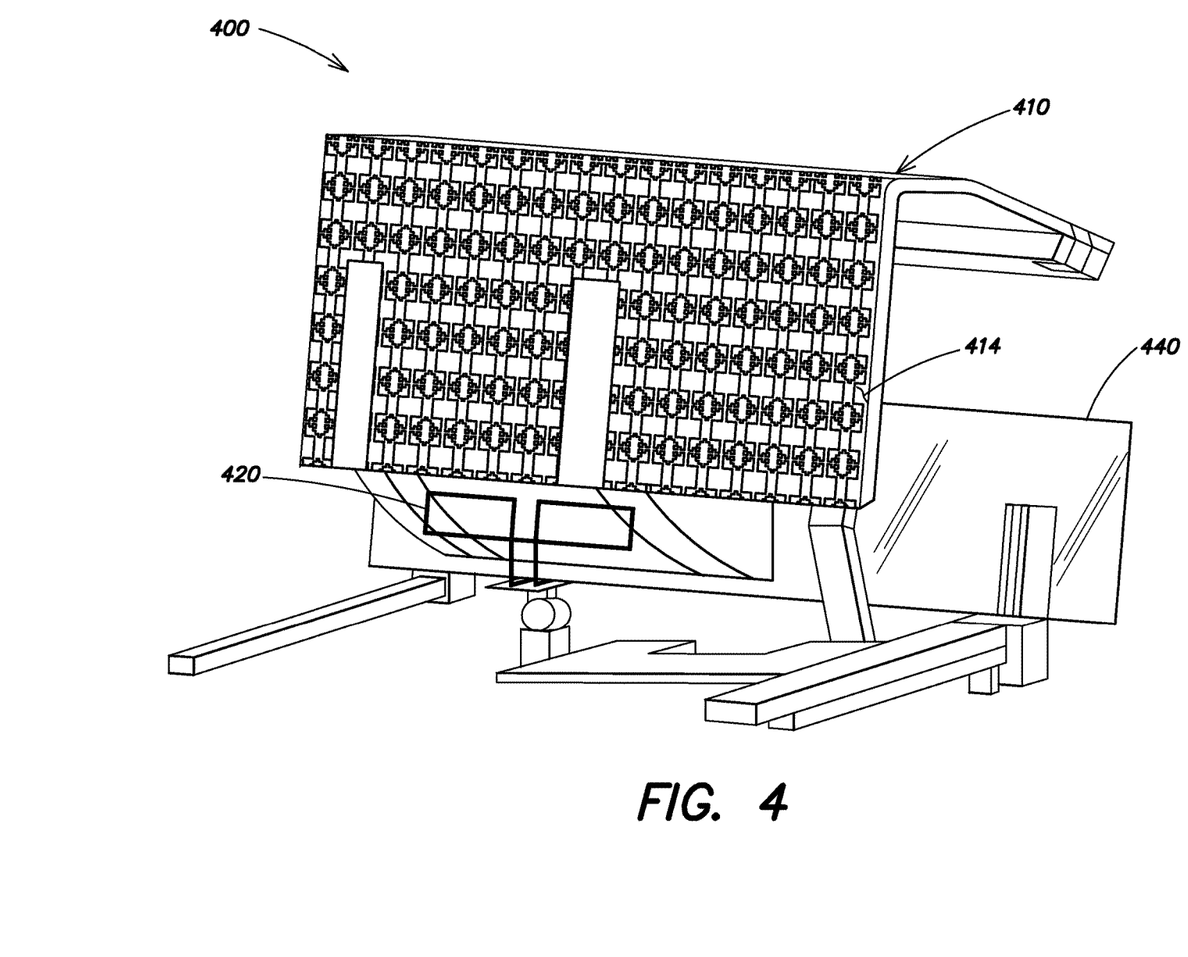
FIG. 4 is a photograph depicting an example of a curved fractal plasmonic array used for a directional antenna in accordance with an exemplary embodiment of the present disclosure.

FIG. 4 is a photograph depicting an example of a curved fractal plasmonic array used for a directional antenna 400 in accordance with an exemplary embodiment of the present disclosure. As indicated, antenna 400 includes a FPA 410 that is disposed on a curved or bent support surface 414. The antenna 400 directs electromagnetic energy received from feed (dipole) 420 and around reflector 440.

Exemplary Embodiments

1. A directional antenna system, the system comprising: a fractal plasmonic array having a plurality of close-packed fractal cells disposed on a supporting surface, wherein each fractal cell includes a fractal shape defining an electrical resonator, wherein the plurality of fractal cells are positioned sufficiently close to one another to support plasmonic transfer of energy between the fractal cells, and wherein the plurality of close packed cells are not galvanically connected to one another; wherein the supporting surface is shaped to provide directional transfer of electromagnetic energy to and from the fractal plasmonic array in desired directions, respectively.

2. The system of embodiment 1, further comprising a feed configured to supply the fractal plasmonic array with electromagnetic energy.

3. The system of embodiment 1, wherein the support surface has a longitudinal axis.

4. The system of embodiment 3, wherein the longitudinal axis is curved.

5. The system of embodiment 4, wherein the longitudinal axis defines an included angle.

6. The system of embodiment 5, wherein the included angle is between about $\pi/4$ and about $3\pi/4$.

7. The system of embodiment 5, wherein the included angle is about $\pi/2$.

8. The system of embodiment 1, wherein the fractal plasmonic array supports the transfer of electromagnetic energy in the S-band.

9. The system of embodiment 1, wherein the fractal plasmonic array supports the transfer of electromagnetic energy in the X-band.

10. The system of embodiment 1, wherein the fractal plasmonic array supports the transfer of electromagnetic energy in the K-band.

11. The system of embodiment 1, wherein the fractal plasmonic array is on a curvilinear manifold and only a portion of the plurality of fractal cells is planar on the manifold.

12. Any of the foregoing embodiments (1-11) implemented as, connected to, or in conjunction with a portion of a larger circuit, circuit board, printed circuit board, and/or circuit structure on or including one or more substrate layers.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A directional antenna system, the system comprising:
a fractal plasmonic array having a plurality of close-packed fractal cells disposed on a supporting surface, wherein each fractal cell includes a fractal shape defining an electrical resonator, wherein the plurality of fractal cells are positioned close to one another to support plasmonic transfer of energy between the fractal cells;

wherein the plurality of close packed cells are not galvanically connected to one another;

wherein the fractal plasmonic array is disposed on the support surface configured as a curvilinear manifold and only a portion of the plurality of fractal cells is planar on the manifold, wherein the fractal plasmonic surface presents an edge and an antipodal edge;

a feed configured to supply the fractal plasmonic array with electromagnetic energy at the edge of the fractal plasmonic array;

wherein the supporting surface is shaped to provide directional transfer of electromagnetic energy to and from edge and antipodal edge of the fractal plasmonic array.

2. The system of claim 1, wherein the support surface has a longitudinal axis.

3. The system of claim 2, wherein the longitudinal axis is curved.

4. The system of claim 3, wherein the longitudinal axis defines an included angle.

5. The system of claim 4, wherein the included angle is between about $\pi/4$ and about $\pi/4$.

6. The system of claim 4, wherein the included angle is about $\pi/2$.

7. The system of claim 1, wherein the fractal plasmonic array supports the transfer of electromagnetic energy in an S-band.

8. The system of claim 1, wherein the fractal plasmonic array supports the transfer of electromagnetic energy in an X-band.

9. The system of claim 1, wherein the fractal plasmonic array supports the transfer of electromagnetic energy in a K-band.

10. The system of claim 1, further comprising a reflector configured to reflect energy toward the fractal plasmonic array.

11. The system of claim 1, wherein the reflector is to divert end-fire radiation to broadside radiation, wherein the fractal plasmonic array functions as a broadside radiator.

* * * * *